United States Patent [19]

Farr

[11] 4,444,440
[45] Apr. 24, 1984

[54] HYDRAULIC BOOSTERS FOR VEHICLE BRAKING SYSTEMS

[75] Inventor: Glyn P. R. Farr, Leek Wootton, England

[73] Assignee: Lucas Industries public limited company, Birmingham, England

[21] Appl. No.: 367,337

[22] Filed: Apr. 12, 1982

[30] Foreign Application Priority Data

Apr. 23, 1981 [GB] United Kingdom ................. 8112632

[51] Int. Cl.³ ............................................. B60T 13/14
[52] U.S. Cl. ......................................... 303/50; 60/548
[58] Field of Search ...................... 60/547.1, 548, 560, 60/563; 303/10, 50, 57

[56] References Cited

U.S. PATENT DOCUMENTS 3,879,948  4/1975  Flory ..................................... 60/548
4,181,371  1/1980  Adachi ................................. 303/50

Primary Examiner—Duane A. Reger

Attorney, Agent, or Firm—Scrivener, Clarke, Scrivener and Johnson

[57] ABSTRACT

An hydraulic booster has a housing provided with an input member, a boost piston, an output member, and connections to a source of pressure and a fluid reservoir. A force applied to the input member is transmitted to the output member and augmented by the boost piston in response to pressurization of a boost chamber controlled by a valve mechanism in response to operation of the input member. An auxiliary chamber is defined between the boost piston and the output member. In a first stage of operation to take up lost-motion in the system, the auxiliary chamber is supplied with fluid from the source to advance the output member relative to the boost piston through a distance determined by a limiting mechanism. In a second stage of operation the output member and the boost piston move together in response to pressurization of the boost chamber. The area of the boost piston on which the auxiliary pressure acts is greater than or equal to the effective area of the boost piston.

10 Claims, 1 Drawing Figure

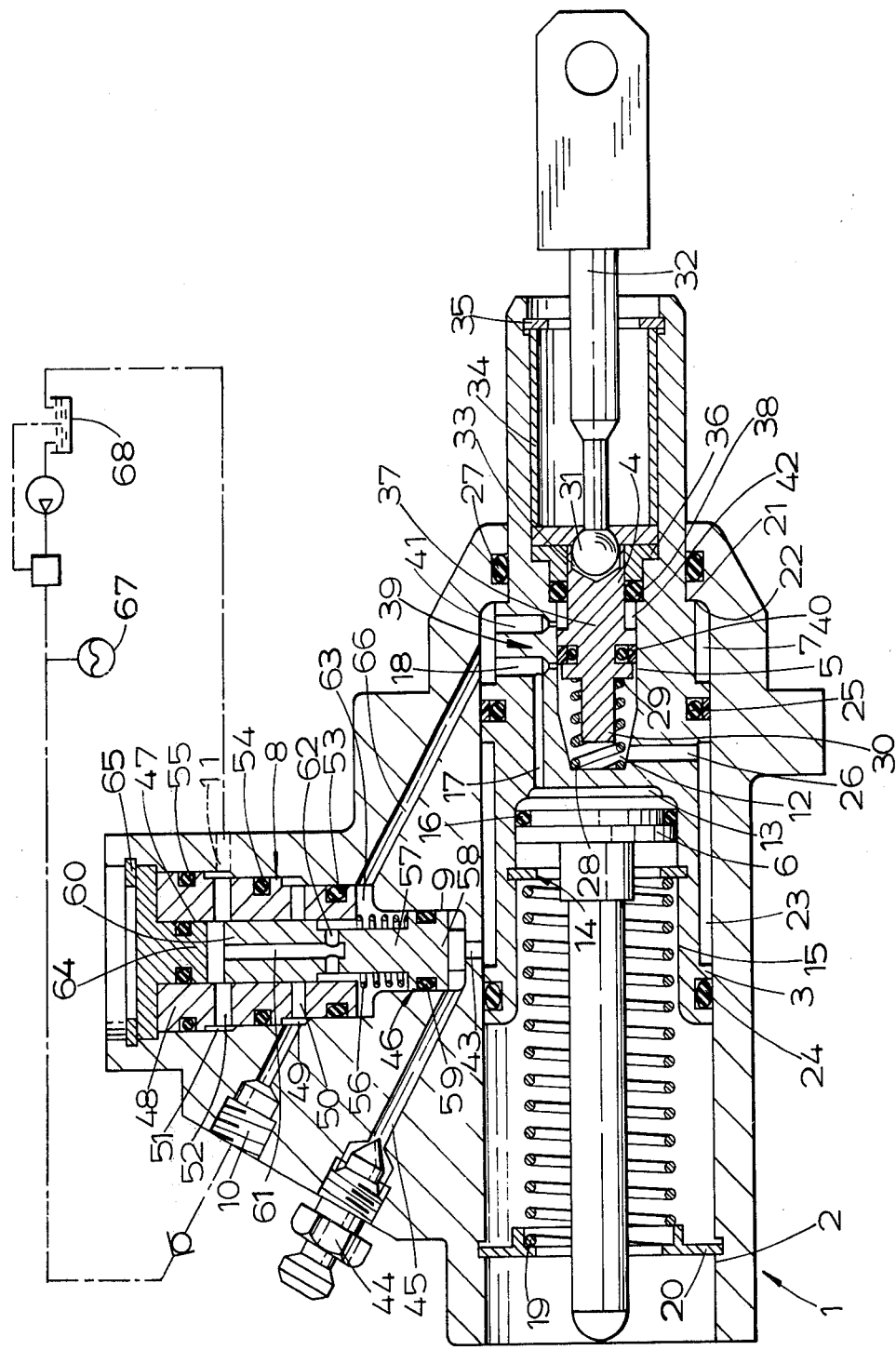

HYDRAULIC BOOSTERS FOR VEHICLE BRAKING SYSTEMS

This invention relates to an hydraulic booster for a vehicle braking system of the kind comprising a housing provided with a bore, an inlet for connection to a source of hydraulic pressure fluid and an outlet for connection to a reservoir for fluid, a pedal-operated input member, an output member, and a boost piston working in the bore, and in operation a force applied to the input member is transmitted to the output member and is augmented by the boost piston, which is advanced in the bore in response to pressurisation of a boost chamber by fluid pressure from the source, pressurisation of the boost chamber being controlled by valve means operative to control communication between the inlet and the boost chamber, and between the boost chamber and the outlet, the valve means being operable in response to relative movement of parts of the booster on movement of the pedal-operated input member.

In most known boosters of the kind set forth, where the output member applies an output force from the booster to a master cylinder in order to pressurise the braking system, considerable initial movement of the pedal is necessary to take up lost-motion in the braking system before the output force can be used to actuate brake-applying means. Lost-motion in a braking system includes not only clearances between mechanical parts of the system, but also elasticity in low stiffness parts, such as seal and hoses and any springs in a brake actuator.

According to our invention in a booster of the kind set forth the output member is movable relative to the boost piston through a distance determined by a limiting means, and an auxiliary pressure chamber is defined between the boost piston and the output member, the area of the boost piston on which pressure in the auxiliary chamber acts being greater than or equal to the area of the boost piston on which pressure in the boost chamber acts, and the booster has two stages of operation, in a first stage following initial movement of the input member in a brake-applying direction, the valve means is operative to supply pressurised fluid from the source to the auxiliary chamber to advance the output member relative to the boost piston through the distance determined by the limiting means without the boost piston being advanced in the bore, the limiting means also being operative to ensure that in a second stage of operation following further movement of the input member, the output member and the boost piston move together in response to pressurisation of the boost chamber.

Only a small initial pedal movement is required to cause the initial movement of the input member. Further lost-motion normally taken up by movement of the pedal is instead compensated for by movement of the output member relative to the boost piston. The distance through which the output member moves relative to the boost piston may be designed to take up all the lost-motion in the braking system and to pressurise the system to a relatively low level.

In the first stage of operation the valve means may be operative to supply pressurized fluid from the source to the boost chamber and the auxiliary chamber at the same time. The arrangement of the areas on the boost piston on which the pressures in the auxiliary chamber and the boost chamber act ensures that in the first stage the output member moves before the boost piston. The operation of the limiting means to determined the distance through which the output member moves relative to the boost piston also ensures that the boost piston and the output member can move together in the second stage.

The limiting means may comprise the engagement of cooperating parts on the output member and the boost piston. Thus in the first stage the output member moves through a fixed distance relative to the boost piston. The engagement of the output member with the boost piston prevents further movement of the output member relative to the boost piston, and the force produced by the pressure in the auxiliary chamber acting on the output member is transmitted to the boost piston to oppose the force produced by the pressure in the auxiliary chamber acting on the boost piston, so that in the second stage the output member and the boost piston can move together.

Conveniently the output member comprises a piston which works in a bore in the boost piston. The limiting means comprises a stop provided on the boost piston, preferably in the form of a circlip, with which the output member engages to limit the distance through which the output member can move relative to the boost piston.

Preferably permanent communication between the pressure chamber and the boost chamber is provided, and the limiting means in this case comprises an engagement between the output member and the boost piston. The communication may be provided in the form of a passage in the boost piston. The auxiliary chamber is then supplied with pressurised fluid through the boost chamber.

Where permanent communication between the boost chamber and the auxiliary chamber is provided there will be a point at which the load in the output member cannot be supported by the pressure in the auxiliary chamber. When this load is reached the output member is moved relatively towards the boost piston, which increases the pedal travel necessary to operate the booster. It is therefore desirable to ensure that the limiting load is difficult to achieve, in order to avoid the increase in pedal travel. The value of the limiting load is determined by the pressure which can be generated in the boost chamber, and the relative areas of the boost piston and the output member on which the pressure acts. For example, if the effective area of the auxiliary chamber is the same as the area of the boost piston on which the pressure in the auxiliary chamber acts, and the areas are such that the area of the boost piston on which the boost pressure acts is equal to the area on which the auxiliary pressure acts, the limiting load will be reached when the boost pressure reaches its maximum value. After this any increase in output force is supplied wholly by increased input force, so the maximum boost pressure corresponds to the "knee point" on a graph of input force against output force. In most cases this limiting load will be too low, since it will be achieved relatively easily in an emergency. It is therefore desirable to increase the effective area of the auxiliary chamber to ensure that the limiting load is achieved only after the knee point has been reached.

In one construction of booster operation of the valve means is controlled by pressure in a control chamber, the pressurisation of which is controlled by relative movement of the input member and the boost piston. Communication of the control chamber with the reservoir is through the boost chamber and is controlled by a recuperation valve responsive to relative movement of the input member and the boost piston, with the input member working in a bore in the boost piston.

In a modification the valve means may comprise a spool working in a bore in the boost piston, the spool being operable in response to relative movement of the input member and the boost piston.

One embodiment of our invention is shown in the single FIGURE of the accompanying drawings, which shows a longitudinal section through an hydraulic booster.

The booster shown in the FIGURE comprises a housing 1 provided with a stepped through-bore 2, in which a boost piston 3 works. An pedal-operated input member in the form of an input piston 4 works in a stepped bore 5 in the boost piston 3, and in operation a force applied to the input piston 4 is transmitted to an output member, in the form of an output piston 6, and is augmented by the boost piston 3 which is advanced in the bore 2 in response to pressure in a boost chamber 7. Pressurisation of the boost chamber 7 is controlled by valve means 8 located in the second bore 9 in the housing 1. The valve means 8 controls communication between the boost chamber 7 and an inlet 10 in the housing 1 for connection to a source of fluid pressure, suitably an accumulator 67, and between the boost chamber 7 and an outlet 11 for connection to a reservoir 68 for fluid. The valve means 8 is operated in responsse to pressure in a control chamber 12, pressurisation of which is controlled by movement of the input piston 4 relative to the boost piston 3. An auxiliary pressure chamber 13 is located between the boost piston 3 and the output piston 6, which is movable relative to the boost piston 3 through a distance determined by limiting means 14, and is adapted to actuate a master cylinder (not shown). The area of the boost piston 3 on which the pressure in the auxiliary chamber 13 acts is greater than the area of the boost piston 3 on which the pressure in the boost chamber 7 acts.

The boost piston 3 is of stepped outline, and projects rearwardly outside the housing 1 so that it is overhung. The output piston 6 works in a bore 15 at the forward end of the boost piston 3, and carries a seal 16 sealing the fluid in the auxiliary chamber 13. The auxiliary chamber 13 is in permanent communication with the boost chamber 7 through an axial passage 17 and a radial port 18 in the boost piston 3. The limiting means 14 comprises a stop in the form of a circlip located on the boost piston 3 with which the output piston 6 engages to limit the relative movement of the output piston 6 and the boost piston 3 away from each other. A spring 19 acts between the circlip 14 and an abutment member 20 located in the bore 2 at the forward end of the housing 1 to bias the boost piston 3 rearwardly so that in the inoperative position shown, a shoulder 21 at a step in diameter of the boost piston 3 engages a shoulder 22 at a step in the bore 2. The boost piston 3 is provided with the bore 5 in which the input piston 4 works. The control chamber 12 is defined in the forward part of the bore 5 and by an annular chamber 23 defined round the forward end of the boost piston 3 between spaced seals 24, 25, the chamber 23 being connected to the bore 5 by a radial passage 26 in the boost piston 3. The boost chamber 7 is defined by a chamber round the boost piston 3, between the seal 25 on the boost piston 3 and a seal 27 in a smaller diameter portion of the bore 2 at the rearward end of the housing 1.

The input piston 4 is also of stepped outline, and is biassed rearwardly by a spring 28 acting between the boost piston 3 and a shoulder 29 formed by a forward reduced diameter portion 30 on the input piston 4. A spherical head 31 on pedal-operated input rod 32 is received in the recess 33 in the rearward end of the piston 4, and rearward movement of the input piston 4 and the rod 32 is limited by their engagement with an abutment member 34 retained in the bore 5 by a circlip 35. The abutment member 34 also retains a flanged annular member 36 in the bore 5, and a portion 37 of the input piston 4 of intermediate diameter works in the member 36, which also carries a seal 38.

A recuperation valve 39 for the control chamber 12 is formed by a seal 40, carried on a portion of the input piston 4 of greatest diameter, which co-operates with the radial port 18 in the boost piston 3, which provides communication between the control chamber 12 and the boost chamber 7. In the inoperative position shown the recuperation valve 39 is open, so that communication between the boost chamber 7 and the control chamber 12 is permitted. Movement of the input piston 4 in a brake-applying direction relative to the boost piston 3 moves the seal 40 to close the recuperation valve 39, trapping fluid in the control chamber 12 which is pressurised on further movement of the input piston 4. A second radial port 41 in the boost piston 3 provides permanent communication between the boost chamber 7 and an annular chamber 42 in the bore 5 round the portion 37 of the input piston 4. The pressure in the boost chamber 7 is also present in this annular chamber 42 and acts on the input piston 4 to urge it in a direction to close the recuperation valve 39.

The pressure in the control chamber 12, the control pressure, acts on the valve means 8 via a radial port 43 in the housing 1 connecting the bore 2 to the bore 9. The control chamber 12 can be bled by means of a bleed screw 44, connected to the control chamber 12 by the port 43, the bore 9 and an inclined passage 45 leading from the bore 9. The boost valve means 8 comprises a spool 46 of stepped outline working in the bore 9 and in a bore 47 of a stationary sleeve 48 located at the outer end of bore 9. The sleeve 48 forms with the bore 9 an inlet recess 49 in communication with the inlet 10, and the sleeve 48 has inlet ports 50 providing communication between the recess 49 and the bore 47. Similarly an exhaust recess 51 is formed in the bore 9 in communication with the outlet 11, and the sleeve 48 has exhaust ports 52 providing communication between the recess 51 and the bore 47. Three spaced seals 53, 54, 55 are provided round the sleeve 48 to seal the inlet and exhaust recesses.

The spool 46 is biased towards the bore 2 by a spring 56 which is located round a portion 57 of the spool 46 of least diameter and acts between the spool 46 and the sleeve 48. The spool 46 also has an inner end 58 of greatest diameter which works in the inner end of the bore 9 and carries a seal 59 to seal the outer end of the bore 9 from the control chamber 12, and an outer end 60 of intermediate diameter which works in the sleeve bore 47. The outer end 60 is provided with an inwardly extending bore 61 leading to a further diametral port 62, which is in communication with a chamber 63 formed in the bores 9 and 47 round the spool portion 57. The outer ends of the bores 9 and 47 are closed by a sealed plug 64 located in the bore 9 by a circlip 65. The chamber 63 communicates with the boost chamber 7 through an inclined passage 66.

Thus the control pressure acts on the inner end 58 of the spool 46 to urge it outwardly, against the loading in the spring 56, and boost pressure acting in the chamber 65 and a chamber between the spool 46 and the plug 64. These forces control the movement of the spool 46 to control communication of the ports 61 and 62 with the inlet and exhaust ports of the sleeve 48.

In the inoperative position shown all the parts are retracted, and the recuperation valve 39 is open so that the control chamber 12 is in communication with the boost chamber 7, and the boost chamber 7 is connected to the reservoir through the valve means 8—that is through passage 66, chamber 63, port 62, bore 61, ports 65 and 52 and exhaust recess 51.

When the booster is to be operated, a force applied to a pedal (not shown) is transmitted to the input piston 4 through the input rod 32, causing movement of the input piston 4 against the loading in the spring 29 and relative to the boost piston 3. This moves the seal 40 past the port 47 to close the recuperation valve 39 trapping fluid in the control chamber 12. Further movement of the input piston 4 then starts to pressurise the fluid in the control chamber 12, which acts on the inner end 58 of the spool 46. When the control pressure acting on the spool 46 produces a force sufficient to overcome the force in the spring 5 the spool 46 moves outwardly. Movement of the spool 46 first isolates the port 65 from the exhaust ports 52 to cut off communication between the boost chamber 7 and the reservoir, and then brings the chamber 63 into communication with the inlet ports 50 to open communication between the pressure source and the boost chamber 7.

Pressure fluid flows into the boost chamber 7 and thence into the auxiliary chamber 13 through the port 18 and passage 17, and into chamber 42 through the port 41. The areas of the boost piston 3 on which pressure fluid acts are arranged so that at this stage of actuation the forces acting on the boost piston 3 in a rearward direction are greater than or equal to the forces acting on the boost piston 3 in a forward direction. In this embodiment this gives the condition that (ignoring spring forces and friction forces) the area of the auxiliary chamber 13 times the boost pressure plus the area of the chamber 42 times the boost pressure is greater than or equal to the area of the boost chamber 7 times the boost pressure plus the effective area of the control chamber 12 times the control pressure. However, the boost pressure present in the auxiliary chamber 13 acts on the output piston 6 to advance it relative to the boost piston 3 to start pressurisation of the master cylinder to actuate the braking system. The output piston 6 then engages with the circlip 14, which prevents further movement of the output piston 6 relative to the boost piston 3, and the travel of the output piston 6 is arranged so that at this point the lost-motion in the braking system will have been taken up, and the system will be pressurised to a relatively low level.

When the output piston 6 engages with the circlip 14 the force acting on the output piston 6 due to the boost pressure in the auxiliary chamber 13 is transmitted to the boost piston 3 to cancel out the rearwardly-acting force due to the boost pressure in the auxiliary chamber 13 acting directly on the boost piston 3. The force acting on the boost piston 3 in the rearward direction is therefore reduced, and the boost piston 3 advances in the bore 2 to augment the output force.

Once the recuperation valve 39 has closed movement of the boost piston 3 will be the same as movement of the input piston 4 to ensure that the recuperation valve 39 remains closed. The boost pressure is also present in the chamber 42, where it acts on the input piston 4 to urge it in a brake-applying direction, and also in the chamber 63 where it acts on the spool 46 in opposition to the control pressure. When the forces on the spool 46 due to the boost pressure and the spring 56 overcome the force due to the control pressure, the spool 46 will move into the equilibrium position, in which the boost chamber 7 is connected neither to the pressure source nor to the reservoir. The spool 46 and the spring 56 are arranged so that in the equilibrium position the control pressure is higher than the boost pressure, and the difference is conveniently 2 bars.

If the effort on the pedal is relaxed, but not wholly removed, then the control pressure decreases to allow the valve spool 46 to move inwardly, re-opening communication between the boost chamber 7 and the reservoir until the forces on the spool 46 equalise and it moves back into the equilibrium position. The boost pressure in the chamber 42 urges the input piston 4 in a brake-applying direction to ensure that the recuperation valve 39 remains closed, and the boost pressure in the auxiliary chamber 13 ensures that the output piston 6 does not move rearwardly relative to the boost piston 3.

If the effort on the pedal is removed altogether, the control pressure decreases to allow the spool 46 to open communication between the boost chamber 7 and the reservoir, and the boost piston 3 and the input piston 4 move back into their retracted positions. The recuperation valve 39 opens to connect the boost chamber 5 to the control chamber 12 only when the boost pressure has fallen to a level at which the spring 28 can overcome the effect of the boost pressure acting in the chamber 42. The output piston 6 then returns to its retracted position due to the force exerted on it by the master cylinder as the master cylinder returns to its retracted position.

Should the valve spool 46 stick in the open or equilibrium positions when the pedal effort is reduced, then the control pressure decreases, but the boost pressure does not. The boost pressure acting on the input piston 4 in the chamber 42 will ensure that the recuperation valve 39 remains closed as long as the valve is stuck, and then the boost pressure acting on the spool 46 will, in general, produce a force sufficient to move the spool 46 inwardly to connect the boost chamber 5 to the reservoir. It is important to ensure that the recuperation valve 39 remains closed in this situation, since if it opened fluid flowing from the boost chamber 7 to the control chamber 12 could balance the spool 46 with the booster operative, and it would then be impossible to control the booster in order to release the brakes.

As the auxiliary chamber 13 is permanently connected to the boost chamber 7 there will be a point at which the load in the output piston 6 cannot be supported by the pressure in the auxiliary chamber 13. The operation of the booster described above assumes that this limiting load has not been reached. When this load is reached the output piston 6 is moved relatively towards the boost piston 3 back to its retracted position, which increases the pedal travel necessary to operate the booster. In order to avoid this increase in pedal travel it is desirable to ensure that the limiting load in the output piston 6 is difficult to achieve. The value of the load is determined by the pressure which can be generated in the boost chamber 7 and the relative areas of the boost piston 3 and the output piston 6 on which pressures act. Thus, for example, in this embodiment if these areas are such that the condition stated above achieves equality, then the limiting load will be reached when the boost pressure reaches its maximum value. After this any further increase in output force must be supplied wholly by increased input force, so the maximum value of the boost pressure corresponds to the 'knee point' on the graph of input force against output force. In most cases this load will be too low that is, it can be achieved relatively easily in an emergency, so it is desirable to make the area of the auxiliary chamber 13, and thus the output piston 6, larger so that the limiting load is not reached until after the knee point has been reached.

Should the pressure source fail so that no boost pressure can be generated the input piston 4 moves relative to the boost piston 3 until the portion 30 engages with the boost piston 3, and thereafter the input force is transmitted from the input piston 4 to the output piston 6 through the boost piston 3.

In a modification the valve means may comprise a spool working in a bore in the boost piston. The spool is operated in response to relative movement of the input piston and the boost piston, and is movable in response to movement of the input piston.

I claim:

1. An hydraulic booster for a vehicle braking system, comprising a housing provided with a bore, an inlet for connection to a source of hydraulic pressure fluid and an outlet for connection to a reservoir for fluid, a pedal-operated input member, an output member, and a boost piston working in said bore, said boost piston being advanced in said bore in response to pressurisation of a boost chamber by pressurised fluid from said source, valve means for controlling pressurisation of said boost chamber, said valve means being operative to control communication between said inlet and said boost chamber, and between said boost chamber and said outlet, and said valve means being operable in reponse to relative movement of parts of said booster on movement of said input member, and said output member is movable relative to said boost piston through a distance determined by a limiting means, and an auxiliary pressure chamber is defined between said boost piston and said output member, the area of said boost piston on which pressure in said auxiliary chamber acts being greater than or equal to the area of said boost piston on which pressure in said boost chamber acts, and said booster has two stages of operation, in a first stage following an initial movement of said input member, said valve means is operative to supply pressurised fluid from said source to said auxiliary chamber, whereby said output member is advanced through said distance determined by said limiting means, without said boost piston being advanced in said bore, and in a second stage following further movement of said input member said limiting means is operative to ensure that said output member and said boost piston move together in response to pressurisation of said boost chamber.

2. A booster as claimed in claim 1, wherein said valve means is operative in said first stage of operation to supply pressurised fluid from said source to said boost chamber and to said auxiliary chamber.

3. A booster as claimed in claim 1, wherein said limiting means comprises cooperating parts on said output member and said boost piston.

4. A booster as claimed in claim 1, wherein said output member comprises a piston which works in a bore in said boost piston.

5. A booster as claimed in claim 3 or claim 4, wherein said limiting means comprises a stop provided on said boost piston and a part on said output member, said part engaging with said stop to limit the distance through which said output member can move relative to said boost piston.

6. A booster as claimed in claim 1 or claim 2, wherein permanent communication between said auxiliary chamber and said boost chamber is provided, and said limiting means comprises cooperating parts on said output member and said boost piston.

7. A booster as claimed in claim 6, wherein said permanent communication is provided by a passage in said boost piston.

8. A booster as claimed in claim 1 or claim 2, wherein in said first stage of operation said auxiliary chamber is supplied with pressurised fluid from said source through said boost chamber.

9. A booster as claimed in claim 1, wherein operation of said valve means is controlled by pressure in a control chamber, the pressurisation of said control chamber being controlled by relative movement of said input member and said boost piston.

10. A booster as claimed in claim 9, wherein communication of said control chamber with said reservoir is through said boost chamber and is controlled by a recuperation valve responsive to relative movement of said input member and said boost piston, with said input member working in a bore in said boost piston.

* * * * *